(12) United States Patent
Sas et al.

(10) Patent No.: US 7,493,995 B2
(45) Date of Patent: Feb. 24, 2009

(54) SHOCK ABSORBER WITH INTEGRATED DISPLACEMENT SENSOR

(75) Inventors: Geert Sas, Meerhout (BE); Mario Maes, Zutendaal (BE); Xavier Lauwerys, Landen (BE); Pol Mermans, Mielen-boven-Aalst (BE); David Chiaradia, Aiken (BE)

(73) Assignee: Tenneco Automotive Operating Company, Inc., Lake Forest, IL (US)

( * ) Notice: Subject to any disclaimer, the term of this patent is extended or adjusted under 35 U.S.C. 154(b) by 397 days.

(21) Appl. No.: 11/181,026

(22) Filed: Jul. 14, 2005

(65) Prior Publication Data

US 2006/0011426 A1 Jan. 19, 2006

Related U.S. Application Data

(60) Provisional application No. 60/587,552, filed on Jul. 14, 2004.

(51) Int. Cl.
*F16F 15/03* (2006.01)
(52) U.S. Cl. ................. 188/267; 188/267.2; 188/322.22
(58) Field of Classification Search .................. 188/266, 188/267, 267.1, 267.2, 322.22
See application file for complete search history.

(56) References Cited

U.S. PATENT DOCUMENTS 4,951,048 A * 8/1990 Ichikawa et al. .............. 341/15
5,315,244 A * 5/1994 Griebeler ................ 324/207.21
5,461,311 A * 10/1995 Nakazato et al. ....... 324/207.24
6,445,178 B1 9/2002 Hoekstra
6,819,208 B1 11/2004 Peghaire et al.
7,259,553 B2 * 8/2007 Arns et al. ............. 324/207.25

FOREIGN PATENT DOCUMENTS

| DE | 19818796 | 11/1999 |
|----|----------|---------|
| EP | 0296808 | 12/1988 |
| EP | WO 9407037 | 3/1994 |
| EP | WO 9823922 | 6/1998 |
| JP | 05272906 | 10/1993 |
| WO | WO 2004005748 | 1/2004 |

OTHER PUBLICATIONS

"How Magnetostriction Works," Temposonics Linear Position and Liquid-Level Sensors, Mar. 16, 2005, http://www.mtssensors.com/Principle.htm.
International Search Report, PCT/US2005/024986, dated Nov. 7, 2005.
Written Opinion of International Searching Authority, PCT/US2005/024986, dated Nov. 7, 2005.

* cited by examiner

*Primary Examiner*—Christopher P Schwartz
(74) *Attorney, Agent, or Firm*—Womble Carlyle

(57) ABSTRACT

A shock absorber include a cylinder, a piston rod coupled to the cylinder, and a piston coupled to the piston rod. The piston rod is magnetically encoded so that it includes a plurality of magnetic phase shifts. The phase shifts allow the position of the piston rod relative to the cylinder to be determined so that it can function as a displacement sensor.

16 Claims, 8 Drawing Sheets

US 7,493,995 B2

SHOCK ABSORBER WITH INTEGRATED DISPLACEMENT SENSOR

RELATED APPLICATIONS

This application claims the benefit of U.S. Provisional Patent Application No. 60/587,552 filed Jul. 14, 2004, the specification of which is herein incorporated by reference.

FIELD OF THE INVENTION

One embodiment of the present invention is directed to a shock absorber for a vehicle. More particularly, one embodiment of the present invention is directed to a shock absorber for a vehicle that includes an integrated displacement sensor.

BACKGROUND INFORMATION

A number of vehicle/automotive applications require as an input signal the distance between the vehicle body (i.e., the sprung mass) and the suspension (i.e., the non-sprung mass). Examples of such applications include automated vehicle leveling systems, semi-active and active suspension systems, and leveling systems for high-intensity discharge headlights.

In known applications, the input signal is usually provided by separately mounted displacement sensors. These sensors are typically mounted on the sprung mass with a bracket and connected to the non-sprung mass by means of a connecting rod and bracket. Each of these sensors is separately connected to the electrical system of the vehicle by means of its dedicated wiring loom.

However, known displacement sensors such as described above can be expensive due to the large number of parts involved, the amount of labor required to mount the sensor, and the necessity of calibrating the sensor after the vehicle exits the manufacturing production line.

Based on the foregoing, there is a need for a displacement sensor that has a reduced number of parts and requires a reduced amount of labor and calibration.

SUMMARY OF THE INVENTION

One embodiment of the present invention is a shock absorber that includes a cylinder, a piston rod coupled to the cylinder, and a piston coupled to the piston rod. The piston rod is magnetically encoded so that it includes a plurality of magnetic phase shifts. The phase shifts allow the position of the piston rod relative to the cylinder to be determined so that it can function as a displacement sensor.

DETAILED DESCRIPTION

One embodiment of the present invention is a shock absorber mounted on a vehicle that has a piston rod that is magnetically encoded. The magnetically encoded piston rod allows the position of the piston rod relative to the shock absorber cylinder to be determined, thus providing a displacement sensor integrated into the shock absorber for the vehicle.

Figure 1:
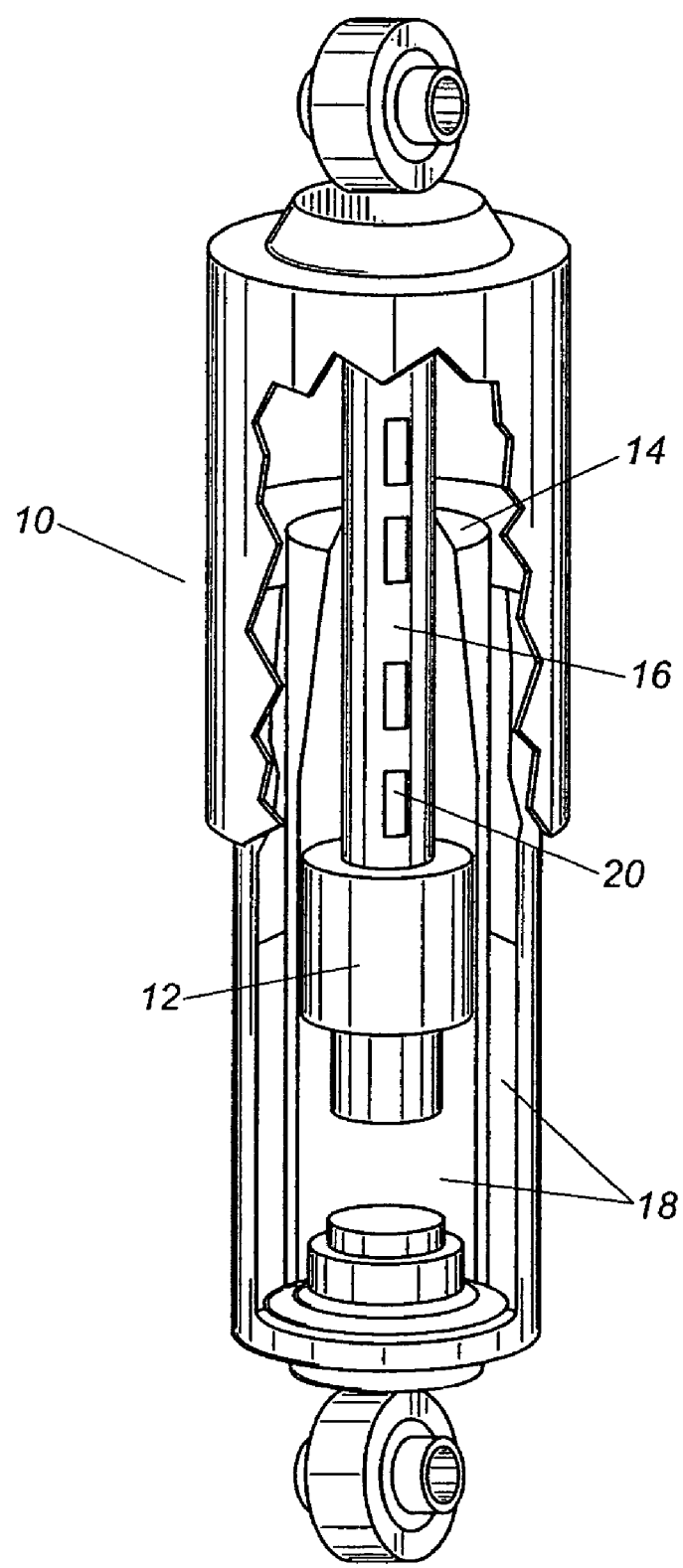
FIG. 1 is a cut-away diagram of a shock absorber in accordance with one embodiment of present invention.

FIG. 1 is a cut-away diagram of a shock absorber 10 in accordance with one embodiment of present invention. Shock absorber 10 includes a piston 12, a cylinder 14, a piston rod 16, and oil 18. Shock absorber 10 functions in a known manner to absorb shock in a vehicle.

Piston rod 16 is encoded with magnetic material 20 that allows shock absorber 10 to also function as a displacement sensor. The encoded magnetic material 20 of piston rod 16 produces local material phase changes at the surface of piston rod 16, which results into transitions of material phases with high and low magnetic permeability. When the difference in magnetic susceptibility is high enough, the transitions can be detected by means of known magnetic sensor techniques, and piston rod 16 can be used as part of a displacement sensor that is integrated into shock absorber 10. One example of known magnetic sensor techniques is disclosed in French patent application no. 04-02175, filed on Mar. 3, 2004 and entitled "Dispositif télescopique avec détection électromagnétique de position".

Figure 2:
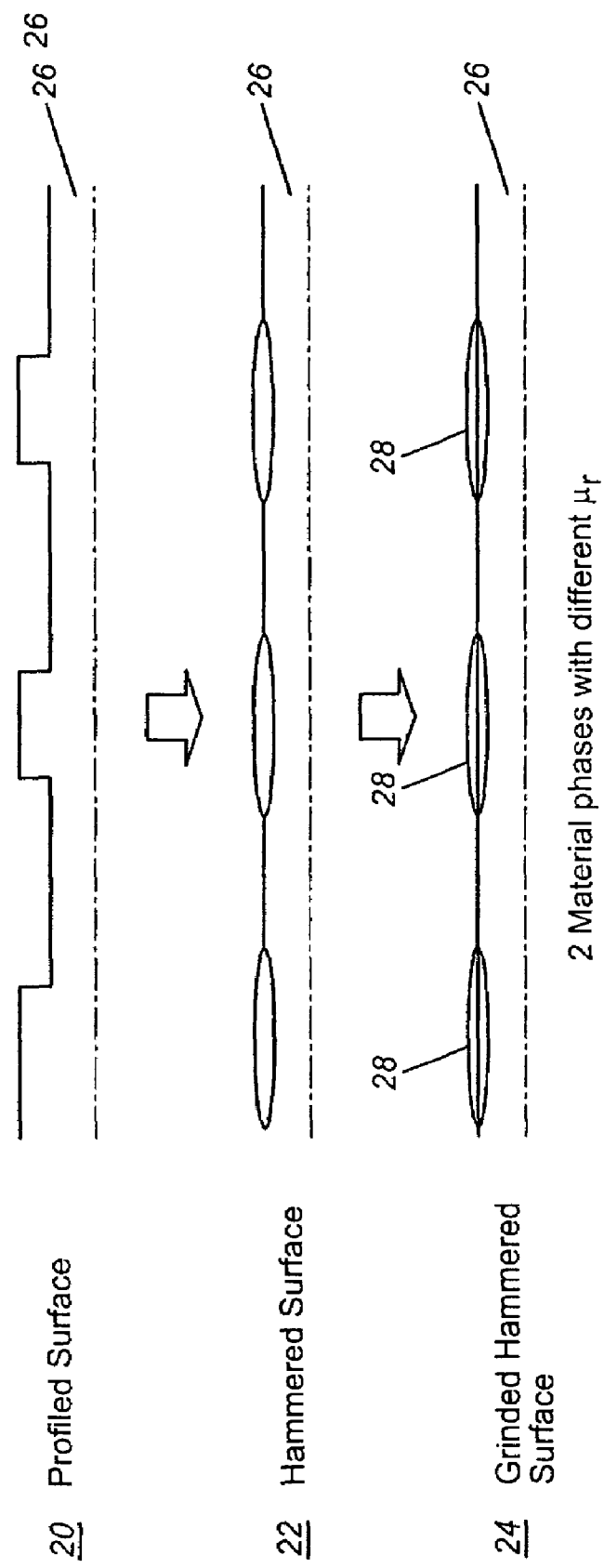
FIG. 2 is a profile view of a piston rod and illustrates manufacturing steps for magnetic encoding in accordance with one embodiment of the present invention.

FIG. 2 is a profile view of a piston rod 26 and illustrates manufacturing steps for magnetic encoding in accordance with one embodiment of the present invention. In one embodiment, piston rod 26 is formed from stainless steel. In other embodiments, piston rod 26 can be formed from any material which is susceptible to phase changes under influence of cold deformation or other type of deformation.

At step 20, a groove profile is milled in the surface of piston rod 26. At step 22, the upper parts of the grooves are deformed by means of a hammering or other compressing operation, providing the required local phase change. Finally, at step 24, after the hammering operation, the flattened profile of the rod is grinded flat to a requested diameter and roughness. As a result, the material phase under the deformed portions 28 of the surface of piston rod 26 will have a different relative magnetic permeability ("$\mu_r$") as the initial material phase and will provide the magnetic encoding. Thus, the resulting piston rod 26 has a mechanically deformed surface at spaced apart locations, the mechanical deformation resulting in a change in magnetic phase at those locations.

Figure 3:
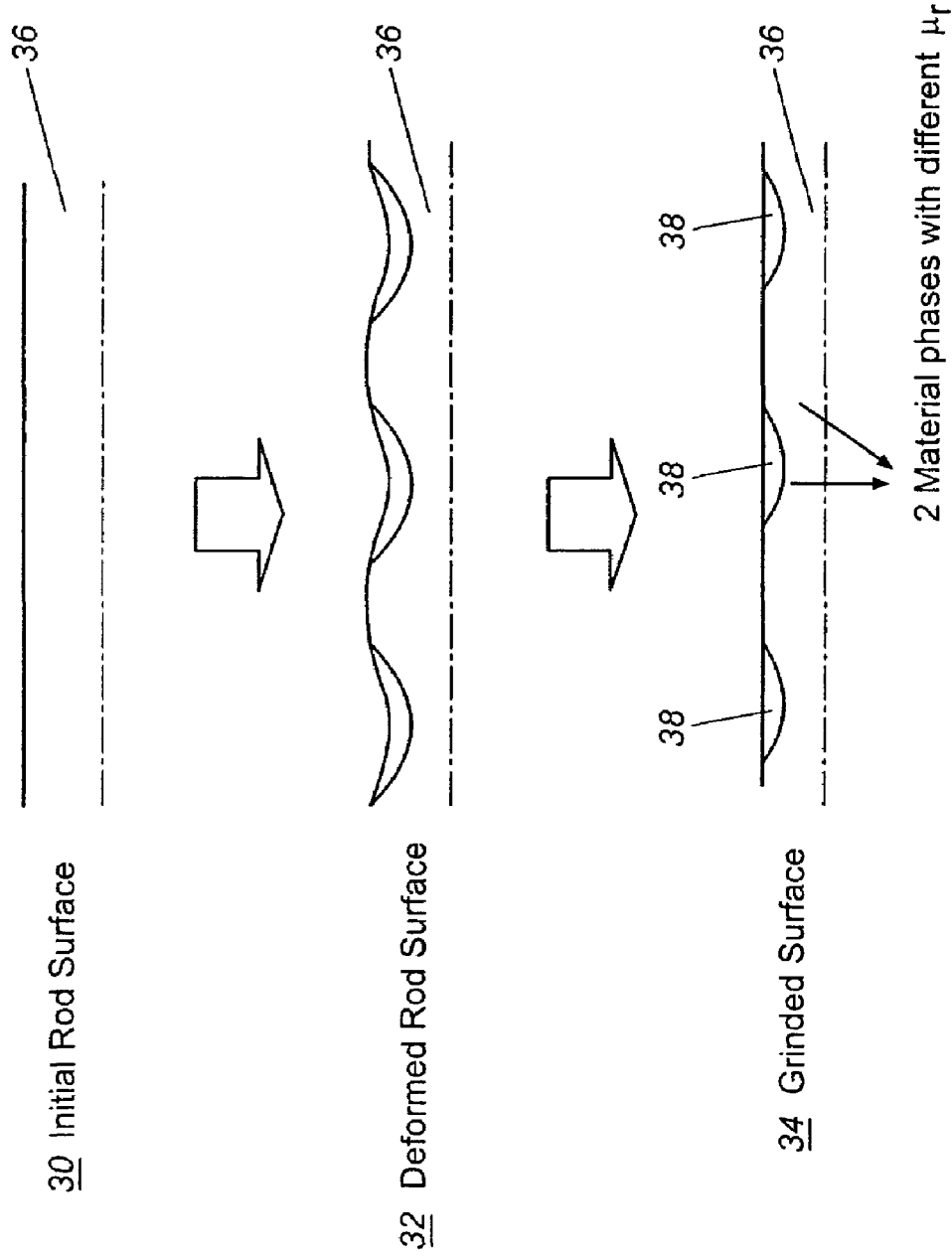
FIG. 3 is a profile view of a piston rod and illustrates manufacturing steps for magnetic encoding in accordance with one embodiment of the present invention.

FIG. 3 is a profile view of a piston rod 36 and illustrates manufacturing steps for magnetic encoding in accordance with one embodiment of the present invention. In one embodiment, piston rod 36 is formed from of stainless steel. In other embodiments, piston rod 36 can be formed from any material which is susceptible to phase changes under influence of cold deformation or other type of deformation.

On the initial rod surface (step 30), a groove profile is deformed into the surface of piston rod 36 (step 32), providing the needed deformation for the local material phase change.

At step 34, rod 36 is grinded to the required diameter, eliminating the peaks of the applied deformation and giving the magnetic profile. As a result, the material phase under the deformed portions 38 of the surface of piston rod 36 will have a different relative magnetic permeability as the initial material phase and will provide the magnetic encoding.

Figure 4:
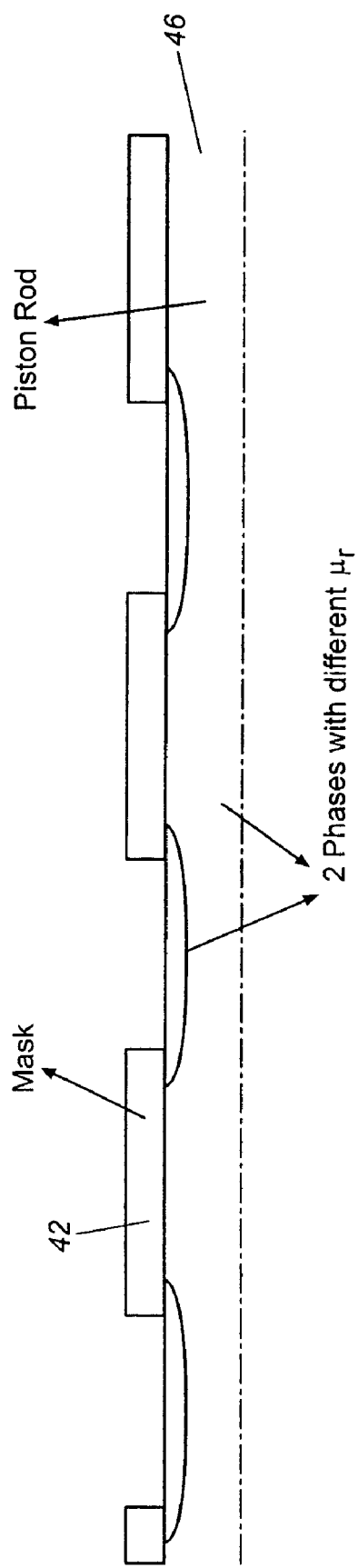
FIG. 4 is a profile view of a piston rod with an integrated displacement sensor in accordance with one embodiment of the present invention.

FIG. 4 is a profile view of a piston rod 46 with an integrated displacement sensor in accordance with one embodiment of the present invention. In one embodiment, piston rod 46 is formed from stainless steel. In one embodiment, piston rod 46 is manufactured as follows: a mask 42 is mounted on the surface of piston rod 46. The not masked parts of rod 16 are cooled down to a temperature of at least $M_s$ (the start of the martensitic transformation). Due to the local cooling of the material the present phase will shift to a different phase and have a different magnetic permeability. Rod 16 is further grinded to the correct diameter and straightness.

Figure 5:
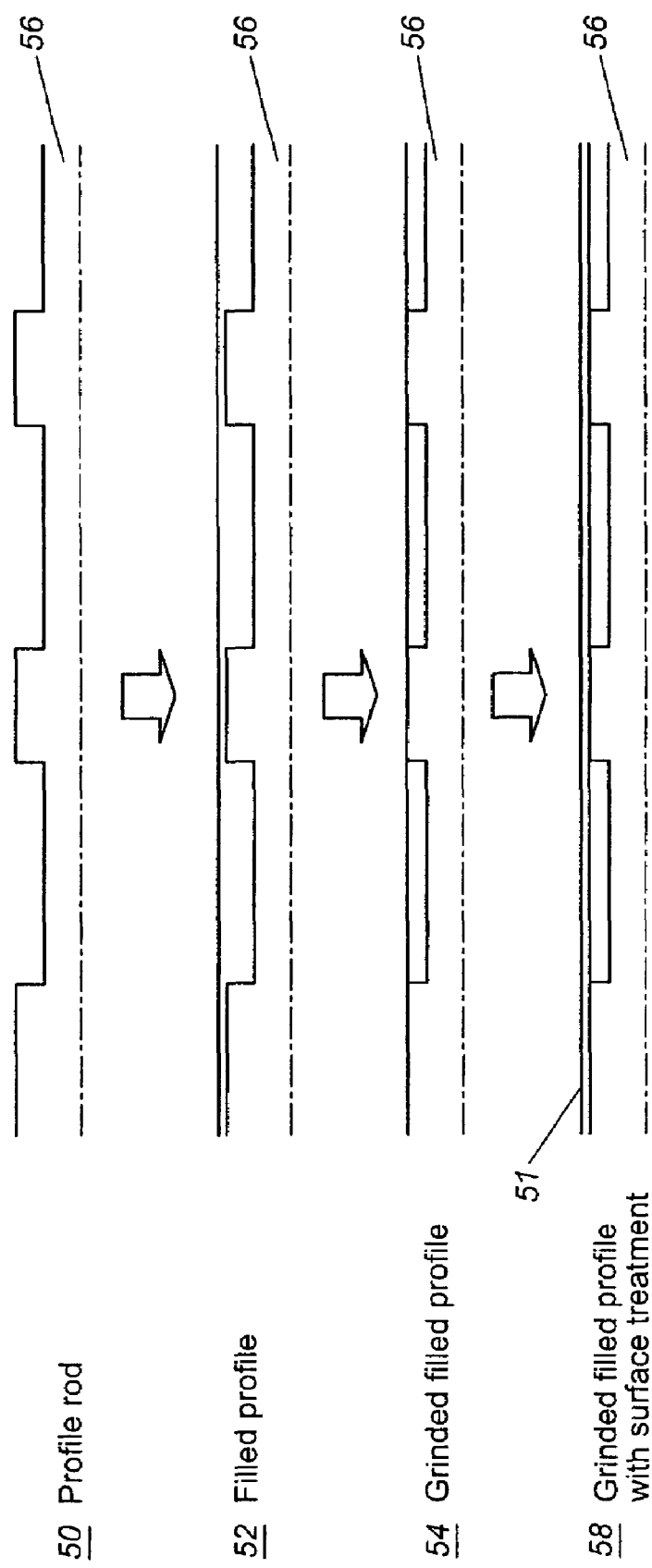
FIG. 5 is a profile view of a piston rod and illustrates manufacturing steps for magnetic encoding in accordance with one embodiment of the present invention.

FIG. 5 is a profile view of a piston rod 56 and illustrates manufacturing steps for magnetic encoding in accordance with one embodiment of the present invention. In one embodiment, piston rod 56 is formed from stainless steel.

At step 50, grooves are made in the surface of the piston rod. At step 52, these grooves are filled by means of a thermal spraying technique, using as spray filler material a material with a significant different relative magnetic permeability compared to the piston rod material. At step 54, the excessive filler material is grinded, providing the rod its final diameter and roughness. At step 58, as an optional final step, a surface treatment is added to the rod to provide the needed surface hardness, corrosion resistance and wear resistance.

Embodiments of the piston rod with an integrated displacement sensor can be formed from a stainless steel rod. However, in other embodiments, a low carbon, hard chrome plated rod that is typically used in a shock absorber can be used in conjunction with the assembly of an aluminum or a stainless steel tube over the rod, as disclosed below.

Figure 6:
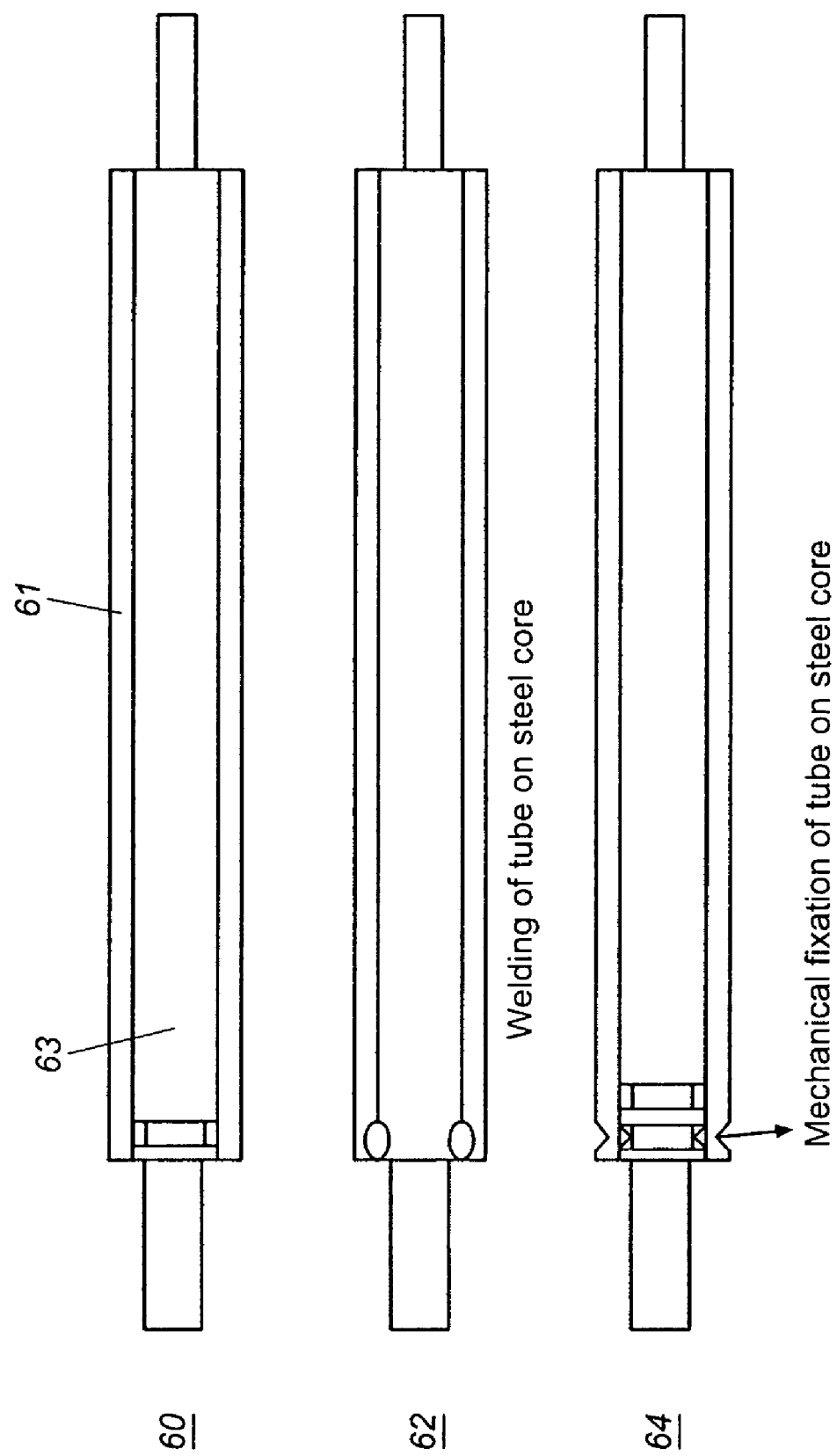
FIG. 6 is a profile view of a piston rod and tube assembly and illustrates multiple embodiments of the assembly of a stainless steel tube over the rod.

FIG. 6 is a profile view of a piston rod and tube assembly and illustrates multiple embodiments of the assembly of a stainless steel tube over the rod. First, a thin stainless steel tube 61 is assembled over a rod core 63. The fixation of the thin stainless steel tube can be done in different ways: heating up the tube and press fitting it on the steel core (step 60); welding the tube on the steel core (step 62); or mechanical fixation of the tube on the steel core (step 64). In one embodiment, after the fixation of the tube to the rod core, the assembly can be heat treated or surface treated in order to increase the surface roughness.

Figure 7:
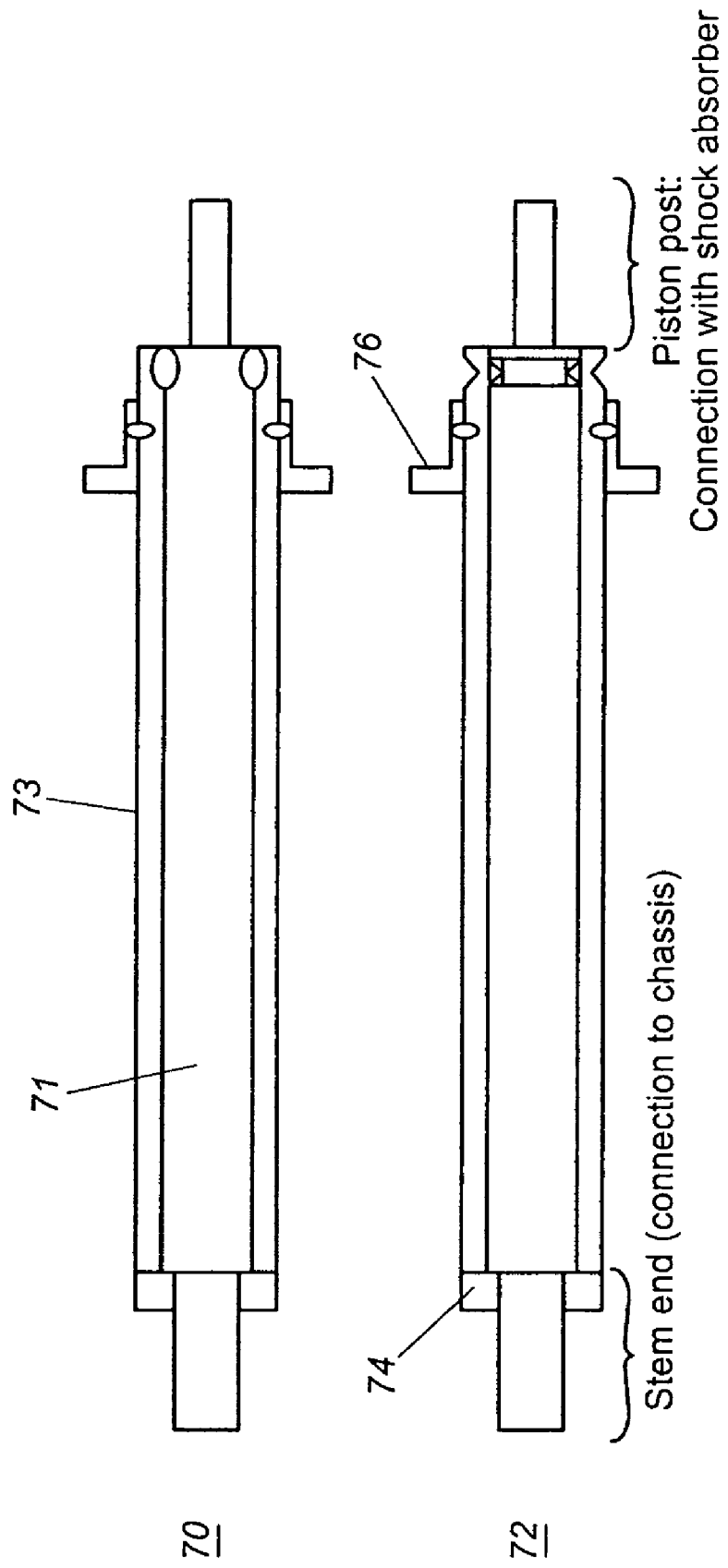
FIG. 7 is a profile view of a piston rod and tube assembly and illustrates multiple embodiments of the assembly of an aluminum tube over the rod.

FIG. 7 is a profile view of a piston rod and tube assembly and illustrates multiple embodiments of the assembly of an aluminum tube over the rod. An aluminum thin tube is anodized in order to achieve the needed surface hardness. An anodized aluminum tube 73 is assembled over a steel core rod 71 and fixed at the stem end side with a rubber seal 74. Fixation at the piston post side can be done in different ways including welding the tube on the steel core (step 70) and mechanical fixation of the tube on the steel core (step 72).

Figure 8:
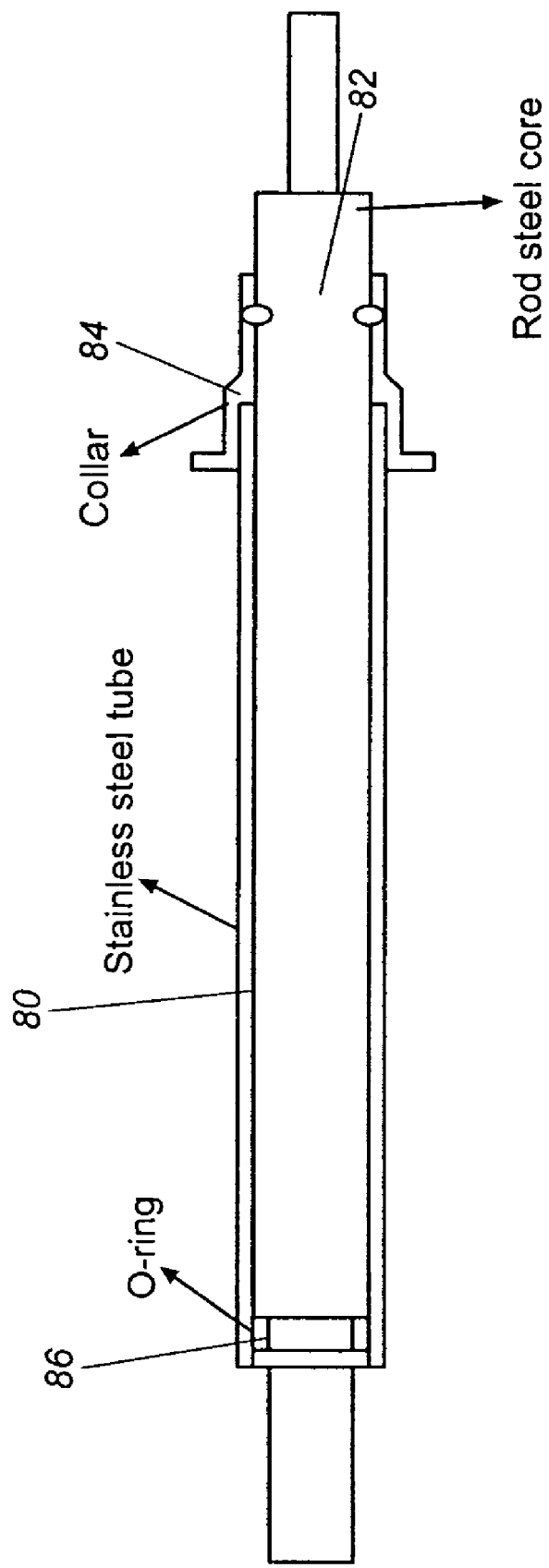
FIG. 8 is a profile view of a piston rod and tube assembly and illustrates another embodiment of the assembly of a stainless steel tube over a rod.

FIG. 8 is a profile view of a piston rod and tube assembly and illustrates another embodiment of the assembly of a stainless steel tube over a rod. A thin stainless steel tube 80 is slid over a steel metal core 82. The tube is positioned on the rod core by means of a collar (rebound stop) 84 which is resistance welded to the steel rod core. At the other side the opening between stainless steel tube and steel core is sealed by means of an O-ring 86. Fixation of the stainless steel tube can be done by means of the top mount fixation, welding of the stainless steel tube to the rod core or mechanical fixation between stainless steel tube and rod core.

As described, embodiments of the present invention of a shock absorber having a piston rod that is magnetically encoded allow the shock absorber to function as a displacement sensor, without requiring a large number of parts, multiple sensors, and calibration of the sensor after it is installed on the vehicle.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A shock absorber comprising:
   a cylinder;
   a piston rod coupled to said cylinder; and
   a piston coupled to said piston rod;
   wherein:
   said piston rod comprises a first portion of a first magnetic phase and a second portion of a second magnetic phase; and
   said piston rod comprises a mechanically deformed surface at said first portion, said mechanical deformation resulting in said first magnetic phase differing from said second magnetic phase at said second portion.

2. The shock absorber of claim 1, wherein said first portion is formed by forming a first groove in said piston rod and filling said first groove with a material having a different magnetic phase than said piston rod.

3. The shock absorber of claim 1, wherein said piston rod is a stainless steel rod.

4. The shock absorber of claim 1, wherein said piston rod comprises a stainless steel tube fastened to a steel core.

5. The shock absorber of claim 1, wherein said piston rod comprises an aluminum tube fastened to a steel core.

6. The shock absorber of claim 1, further comprising circuitry to detect a magnetic transition between said first portion and said second portion to calculate a displacement of said piston rod in said cylinder.

7. The shock absorber of claim 1, wherein said mechanically deformed surface comprises a hammered surface.

8. The shock absorber of claim 1, wherein said mechanically deformed surface comprises a hammered and ground surface.

9. The shock absorber of claim 1, wherein said mechanically deformed surface comprises a compressed surface.

10. A displacement sensor for a vehicle comprising:
    a shock absorber cylinder;
    a piston rod disposed within said cylinder;
    a first magnetic phase portion disposed on said piston rod; and
    a second magnetic phase portion disposed on said piston rod, wherein
    said piston rod comprises a mechanically deformed surface at said first magnetic portion, said mechanical deformation resulting in said first magnetic phase portion having a first magnetic property which differs from a second magnetic property at said second magnetic phase portion.

11. The displacement sensor of claim 10, wherein said first magnetic phase portion has a different magnetic phase than said second magnetic phase portion.

12. The displacement sensor of claim 10, wherein said first magnetic phase portion has a different relative magnetic permeability than said second magnetic phase portion.

13. The displacement sensor of claim 10, wherein said first magnetic phase portion is formed by forming a first groove in said piston rod and filling said first groove with a material having a different magnetic phase than said piston rod.

14. The displacement sensor of claim 10, wherein said mechanically deformed surface comprises a hammered surface.

15. The displacement sensor of claim 10, wherein said mechanically deformed surface comprises a hammered and ground surface.

16. The displacement sensor of claim 10, wherein said mechanically deformed surface comprises a compressed surface.

* * * * *